United States Patent [19]

Cossement et al.

[11] Patent Number: 5,236,982

[45] Date of Patent: Aug. 17, 1993

[54] SIZE COMPOSITION

[75] Inventors: Marc Cossement, Fleron; Nadia Masson, Retinne; Willy Piret, Xhendelesse, all of Belgium

[73] Assignee: Owens-Corning Fiberglas Technology, Inc., Summit, Ill.

[21] Appl. No.: 912,559

[22] Filed: Jul. 13, 1992

[51] Int. Cl.⁵ ............................................. C08K 5/54
[52] U.S. Cl. .................................... 524/188; 524/507; 428/391
[58] Field of Search .................. 524/188, 507; 428/391

[56] References Cited

U.S. PATENT DOCUMENTS

| | | | |
|---|---|---|---|
| 4,185,138 | 1/1980 | Graham | 524/188 |
| 4,301,052 | 11/1981 | Pollman | 524/188 |
| 4,394,418 | 7/1983 | Temple | 524/188 |
| 4,626,567 | 12/1986 | Chang | 524/188 |
| 4,745,028 | 5/1988 | Das et al. | 428/391 |
| 4,956,240 | 9/1990 | Williams et al. | 524/188 |

FOREIGN PATENT DOCUMENTS

| | | |
|---|---|---|
| 0356655 | 7/1989 | European Pat. Off. . |
| 62-225548 | 10/1987 | Japan . |
| 62-225549 | 10/1987 | Japan . |

*Primary Examiner*—Paul R. Michl
*Assistant Examiner*—Aga Asinovsky
*Attorney, Agent, or Firm*—Ted C. Gillespie; Patrick P. Pacella

[57] ABSTRACT

An aqueous coating composition comprising a polyurethane/isocyanate emulsion, a homopolymer of acrylic acid, an amino silane and water. The sizes are particularly useful for reinforcing polyamide resins (nylons).

25 Claims, No Drawings

SIZE COMPOSITION

TECHNICAL FIELD

This invention relates to a size composition, coated glass fibers and reinforced thermoplastics. These sizes are particularly useful for reinforcing polyamide resins (nylons).

BACKGROUND ART

Numerous thermoplastic materials are available including polyolefins, polyacetals, polyamides (nylons), polycarbonates, polystyrenes, styrene-acrylonitrile copolymers, acrylonitrile-butadiene styrene (ABS) copolymers and polyvinyl chloride (PVC). Thermoplastic resin and glass fibers are made into useful shapes by means of heat and pressure. Processes include injection of hot resin into a mold, extrusion and pultrusion. Other processes include hot calendaring, casting, vacuum forming and the like. Chopped glass fibers feed into these processes to strengthen and stiffen the resulting composite.

DISCLOSURE OF THE INVENTION

The invention includes a size consisting essentially of:
a polyurethane/isocyanate emulsion containing blocked isocyanates;
a homopolymer of acrylic acid monomer;
one or more amino organo-silane coupling agents; and
water.

In the preferred embodiment, we also add polyvinyl pyrrolidone (PVP) for better strand integrity, size stability and fuzz reduction.

The resulting coated glass fibers yield desirable reinforced thermoplastics. We have found an especially surprising effect on the processability of the reinforcements without any sacrifice in mechanical properties for reinforced nylon in the case of aging in a water/ethylene glycol medium.

DESCRIPTION OF THE PREFERRED EMBODIMENTS

The glass size composition of the present invention is useful with filamentous glass which is well known to those skilled in the art. Various types of glass filaments, such as "E" glass and other known types of glass, can be sized with the size. The size is useful on glass filaments having a wide range of diameters and can be used on glass filaments whether or not they are gathered into fibers, ropes, rovings, yarns and the like.

Various polyurethane dispersions which are useful in the present invention include aqueous emulsions of blocked polyurethane resins such as aqueous solutions of polyurethane polymers formed by a reaction between an organic isocyanate or polyisocyanate and an organic polyhydroxylated compound or hydroxyl terminated polyether or polyester polymer. The polyurethane dispersion may contain a crosslinking group.

Other suitable examples include chain extended thermoplastic polyurethanes derived from chain extension of an isocyanate-terminated prepolymer prepared by the reaction of an aliphatic or cycloaliphatic diisocyanate with a polyalkylene ether polyol. A suitable polyurethane emulsion is Rucothane latex having a trade designation of 2011L available from Ruco Chemical Corp. from New York. This material along with other Rucothane polyurethane lattices are thermoplastic polyurethane lattices comprised of high molecular weight aliphatic isocyanate-based thermoplastic elastomers in a water dispersion with an anionic or nonionic surfactant, where the dispersion or latex has varying particle sizes. The lattices typically have a polymer solids content ranging from around 55 to 65 percent by weight where the urethane polymer has an ester backbone.

Other suitable polyurethane dispersions include:

| From Bayer: | PU402 |
| | PU403 |
| | PU130 |
| From Baxenden: | BW 197-58X |
| | BW 199-76X |
| From Witco: | 290H |
| From Hooker: | Ruco 2010 L |
| From Synthomer: | Vondic 2220 |

The preferred polyurethane is Baxenden 199-76X.

One suitable polyurethane crosslinking agent dispersion is an anionic aliphatic low branched polyester based polyurethane emulsion containing caprolactam blocked isocyanate which enables the polyurethane polymer to be cured at a temperature exceeding about 150° C. The polyurethane/crosslinking agent system has a milky white appearance having a percent solids of 60, an anionic particle charge of pH at 25° C. of 8.0, and a viscosity at 25° Brookfield RVT of 150 cps. Specifically, one suitable polyurethane crosslinking agent dispersion comprises an aqueous dispersion of a high molecular weight branched polyurethane polymer based on polyester polyol and 1,1-methylenebis-(isocycanatocyclohexane) wherein some of the polymer chains are terminated with blocked isocyanate groups. Other suitable polyurethane crosslinking agent dispersions comprise polyurethane/isocyanate emulsions of an aliphatic polyurethane containing blocked isocyanate having a milky white appearance, a percent solids of 40, a pH at 25° C. of approximately 8–9, and a viscosity at 25° C. Brookfield RVT of approximately 200–250 cps. Other suitable polyurethane crosslinking agent dispersions comprise a polyurethane and a trimer of 3-isocyanatomethyl-3,5,5-trimethylcyclohexyl isocyanate ("isophorone diisocyanate" or "IPDI") blocked with butanone oxime.

Other blocking groups like phenols, cresols Σ-caprolactam, malonates, aceto acetates, sodium bisulfite also may be used.

The acrylic acid monomer has the formula:

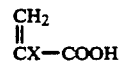

wherein X is a hydrogen atom or a methyl or an alkyl group having 1 to 10 carbon atoms. Preferably, the acrylic acid monomer has the formula:

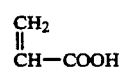

The salt of the polyacrylic acid may be that of alkali metal or ammonium salts either derived from ammonium hydroxide or from any organic primary, secondary or tertiary amine poly- or monofunctionalized, e.g. triethylamine, triethanolamine, glycine, dimethylaminoethylmethacrylate. Degree of neutralization of the polyacrylic acid may vary from about 20% to 90%. Below 20%, the shelf life of the polyacrylic acid silane mixture is too short and does not present industrial interest. Preferred salts are those from ammonium hydroxide with a degree of neutralization of about 40%. Generally the ammonium hydroxide is added to the polyacrylic acid aqueous solution in order to reach a pH of about 5 or higher if it is necessary to adjust the pH of the polyacid solution with the pH of the polyurethane dispersion.

Some commercially available polyacrylic acid homopolymers that have been evaluated successfully are now given as example:

(aminomethyl)-gamma-amino propyltrimethoxysilane and triamino silanes.

The aqueous sizing compositions of the invention can be prepared following generally accepted mixing practices. These sizing compositions can be applied to the glass fiber using any convenient method. The amount of aqueous sizing composition applied is not narrowly critical, but is preferably controlled so as to deposit on the glass fibers a size coating comprising the dried residue of the aqueous: sizing composition of the invention in an amount from about 0.25 to about 2 percent of the weight of the glass, taking into account the dilution of the non-volatile components in the aqueous sizing composition and the usual mechanical loss of some of the Acrylic acid homopolymer solutions:

(1) From Allied Colloid (UK)

| | |
|---|---|
| VERSICOL E5: | Active content 25%; pH 1.5; specific gravity 1.10; viscosity 16 cps (25%); approximate Mw 3,500. |
| VERSICOL E7: | Active content 25%; pH 1.5; specific gravity 1.10; viscosity 50 cps (25%); approximate Mw 30,000. |
| VERSICOL E9: | Active content 25%; pH 1.5; specific gravity 1.10; viscosity 200 cps (25%); approximate Mw 75,000. |
| ANTIPREX 461: | Active content 50%; pH 3.0; specific gravity 1.26; viscosity 600 cps (25%). |
| DISPEX A40: | Ammonium salt; active content 40%; pH 7.5–8.5; specific gravity 1.16. |
| SYNCOL F40: | Active content 40%; pH 2-2.5; viscosity 3.0 cS (5%, 25° C.). |

(2) From Rohm and Haas
Acrysol A-1, Acrysol A-3, Acrysol A-5
TYPICAL PHYSICAL PROPERTIES

| | ACRYSOL A-1 | ACRYSOL A-3 | ACRYSOL A-5 |
|---|---|---|---|
| Solids content, % | 25 | 25 | 12.5 |
| pH (5% aqueous solution) | about 2 | about 2 | about 2 |
| Dilutability with Water | infinite | infinite | infinite |
| Molecular weight | ~60,000 | ~190,000 | ~400,000 |
| Viscosity (Brookfield), cps @ 25° C. | | | |
| 5% solids content | 15 | 18 | 20 |
| 12.5% solids content | 15 | 65 | 260 |
| 25% solids content | 160 | 1,550 | — |

Acrysol LMW-10, Acrysol LMW-20, Acrysol LMW-45
Typical properties of ACRYSOL Polymers

| PRODUCT | FORM | MOLECULAR WEIGHT[2] Mw | Mn | % TOTAL SOLIDS | DENSITY 25° C. LBS/GAL | pH | BROOKFIELD VISCOSITY 25° C. cps |
|---|---|---|---|---|---|---|---|
| ACRYSOL LMW-45 | Partial Na Salt, 20% neutralized | 4,500 | 3,000 | 48 | 10.2 | 4.0 | 800 |
| ACRYSOL LMW-20 | Partial Na Salt, 20% neutralized | 2,000 | 1,425 | 48 | 10.3 | 4.0 | 185 |
| ACRYSOL LMW-10 | Partial Na Salt, 20% neutralized | 1,000 | 750 | 48 | 10.5 | 4.0 | 45 |

(3) From B F GOODRICH
Good-Rite K732, Good-Rite K752

| Good-riteU/Polymers Appearance | K-752 Hazy to Clear Amber Solution | K-732 Hazy to Clear Amber Solution |
|---|---|---|
| Molecular Weight | 2,100 | 5,100 |
| Total solids (%) | 63 | 50 |
| Sodium ion content (%) | 0.79 | 0.49 |
| pH (as shipped) | 2.2–3.0 | 2.2–3.0 |
| pH (1% aqueous solution) | 3.1 | 2.8 |
| Percent neutralization (weight %) | 4.9 | 3.4 |
| Specific gravity (g/cc) | 1.23 | 1.18 |
| Viscosity, cP at 25° C. | 400–1400 | 250–500 |
| Surface tension (dyne/cm) (5% solution, pH 10) | 59.1 | 62.9 |

Particularly suitable organo-silane coupling agent includes amino silanes such as gamma-aminopropyltriethoxysilane, available as A-1100 from Union Carbide. In various embodiments, the coupling agent can optionally further include additional, conventionally known aminosilanes such as gamma-methacryloxypropyltrimethoxy silane and/or a diamino silane such as N-betaaqueous composition initially applied to the fibers before it is dried.

The aqueous sizing composition can be applied to the glass fibers drawing the fibers over a roll, pad, or other suitable surface wet or flooded with the aqueous sizing composition, by spraying, by dipping, or by any other suitable means. The overall concentration of the non-volatile components in the aqueous sizing composition can be adjusted over a wide range according to the means of application to be employed, the character of the glass fibers to be sized, e.g., their diameter and composition, and the weight of dried size coating desired for the intended use of the sized fibers.

The sized glass fibers of the invention can be incorporated into the curable matrix resin which is to be reinforced thereby in the final cured resinous article as either monofilament or multi-filament strand, as either long, essentially continuous, elements or short chopped pieces, depending upon the shape and method of fabrication of the article to be formed. The sized glass fibers of this invention are particularly adapted for use in the form of chopped glass fibers. Principal among such reinforcements are glass fibers which generally have diameters of about 0.0025 to 0.0075 inch and lengths of about 0.13 to about 2.00 inch.

Generally, the size composition has the following composition in parts per 100 parts of solids:

|  | parts per 100 parts of solids |
|---|---|
| polyurethane/isocyanate emulsion | 5 to 80 |
| homopolymer of acrylic acid | 20 to 90 |
| amonium hydroxide | to pH 5-11 |
| amino silane | 3 to 50 |
| water | balance |

Preferably, the size composition ranges has the following formulation:

|  | parts per 100 parts of solids |
|---|---|
| polyurethane/isocyanate emulsion | 20 to 60 |
| homopolymer of acrylic acid | 30 to 70 |
| amonium hydroxide | to pH 5-11 |
| amino silane | 3 to 25 |
| water | balance |

The addition of a base to the size is primarily for pH control. The amount of base employed is sufficient to impart to the size a pH of 3 or higher. However, the quantity of base may be increased to impart to the size a pH within the size from about 5 to about 11.

The classical additives of the sizing art may be added to the formulation when necessary like:
antioxydant
processing aids
humidity regulator
surfactants to help PU dispersion
dispersion stabilizer
antistatic
lubricants
stabilizers
optical brightener
discolorant
etc. . .

The lubricant may be any normally liquid or solid lubricating material suitable for the purpose. Such materials include vegetable and mineral oils, waxes or various types and certain materials which also have utility as surfactants, such as fatty acid monoesters of polyalkylenegylcols.

Surfactants that aid dispersion are ethoxylated fatty acids or di-acids, an ethoxylated nonylphenol, and an ethoxylated octylphenol.

Polyvinyl pyrrolidone (PVP) also may be present for better processing, i.e., strand integrity, size stability and fuzz reduction.

EXAMPLE I

Our preferred size composition has the following formation:

|  | parts per 100 parts of solids |
|---|---|
| polyurethane/isocyanate emulsion; Baxenden 199-76X | 26 |
| partial amonium salt of acrylic acid, DP-6195 from Allied Colloids | 65.6 |
| gamma-aminopropyl triethoxysilane, Union Carbide A-1100 | 3.4 |
| luviskol PVP K90 from BASF 20% solution | 5.0 |
| water | balance |

The size is efficient on glass fibers from 0.1 to 1.2 LOI.

The aqueous solution has a solids content of 6.3 weight percent and a pH of 5-5.5. The size was applied to individual glass fibers by conventional application methods and at rates such that the strand solids, on drying, amounted to about 0.8% weight percent.

Glass fibers comprising standard length chopped glass fibers having an average length of about 0.125 inches and from about 0.00035-0.00039 inch fiber diameter were produced from the strands.

The present formulation allows for excellent processability of the sized fibers, i.e., we observed excellent strand integrity, size stability and fuzz reduction over standard products for reinforcing nylon resins.

EXAMPLE II

Sized chopped glass fibers of Example I were compared to standard products. We tested reinforcements from Example I and standard products under hydrolysis pressure at 120° C. We carried out the tests in a medium of 50/50 water/ethylene glycol mixture. Mechanical properties such as tensile strength, tensile elongation, tensile modulus, charpy unnotched impact strength for the products of Example I were essentially the same as for the standard products.

We claim:

1. An aqueous size composition consisting essentially of:
   a polyurethane/isocyanate emulsion containing blocked isocyanates;
   a homopolymer of acrylic acid monomer;
   one or more amino organo-silane coupling agents; and
   water.

2. The size composition of claim 1, wherein the polyurethane/isocyanate dispersion comprises an aliphatic polyurethane emulsion containing blocked isocyanate.

3. The size composition of claim 1, wherein the polyurethane/isocyanate dispersion comprises an aqueous emulsion of blocked or unblocked polyurethane resins comprising an aqueous solution of polyurethane polymer formed by a reaction between and organic isocyanate or polyisocyanate and an organic polyhydroxylated compound or hydroxyl terminated polyether or polyester polymer.

4. The size composition of claim 1, wherein the polyurethane/isocyanate dispersion comprises an anionic aliphatic low branched polyester based polyurethane emulsion containing caprolactam blocked isocyanate having a milky white appearance having a percent solids of 60, an anionic particle charge, a pH at 25° C. of 8.0, and a viscosity of 25° C. Brookfield RVT of 150 cps.

5. The size composition of claim 1, wherein the polyurethane/isocyanate dispersion comprises an aqueous dispersion of a high molecular weight branched polyurethane polymer based on polyester polyol and 1,1-methylenebis(isocyanatocyclohexane) wherein some of the polymer chains are terminated with blocked isocyanate groups.

6. The size composition of claim 1, wherein the polyurethane/isocyanate dispersion comprises an emulsion of an aliphatic polyurethane containing blocked isocyanate having a milky white appearance, a percent solids of 40, a pH at 25° C. of approximately 8–9, and a viscosity at 25° C. Brookfield RVT of approximately 200–250 cps.

7. The size composition of claim 1, wherein the polyurethane/isocyanate dispersion comprises a polyurethane and a trimer of 3-isocyanatomethyl-3,5,5-trimethylcyclohexyl isocyanate blocked with butanone oxime.

8. The size composition of claim 1, wherein the acrylic acid monomer has the formula:

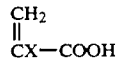

wherein X is a hydrogen atom or a methyl or an alkyl group having 1 to 10 carbon atoms.

9. The size of claim 1 including polyvinyl pyrrolidone.

10. The size composition of claim 1, wherein acrylic acid polymer has molecular weight in the range of about 750 to about $10 \times 10^6$.

11. The size composition of claim 10, wherein the molecular weight ranges from 2000 to 75,000.

12. The size composition of claim 10, wherein the molecular weight ranges from 2000 to 5000.

13. The size of claim 1, wherein the acrylic acid monomer has the formula:

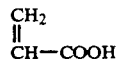

14. The size composition of claim 1, wherein the acrylic acid polymer is an alkalimetal salt or an ammonium salt.

15. The size of claim 1, wherein the acrylic acid polymer is a salt of any primary, secondary or tertiary amine.

16. The size of claim 1, wherein the acrylic acid polymer is a salt of ammonium hydroxide.

17. The size of claim 1, wherein the amino silane is gamma-aminopropyltriethoxysilane.

18. The size composition of claim 1 having the following composition:

|  | parts per 100 parts of solids |
| --- | --- |
| polyurethane/isocyanate emulsion | 5 to 80 |
| homopolymer of acrylic acid | 20 to 90 |
| amonium hydroxide | to pH 3 or higher |
| amino silane | 5 to 50 |
| water | balance. |

19. The size of claim 18 including polyvinyl pyrrolidone.

20. The size of claim 1 having the following composition:

|  | parts per 100 parts of solids |
| --- | --- |
| polyurethane/isocyanate emulsion | 20 to 60 |
| homopolymer of acrylic acid | 30 to 70 |
| amonium hydroxide | to pH 3 or higher |
| amino silane | 5 to 25 |
| water | balance. |

21. The size of claim 20 including polyvinyl pyrrolidone.

22. Glass fibers sized with aqueous size composition of claim 1.

23. Thermoplastic resins reinforced with the glass fibers of claim 22.

24. Polyamide resins reinforced with the glass fibers of claim 22.

25. Nylon resins reinforced with the glass fibers of claim 22.

* * * * *